United States Patent [19]

Raitto

[11] 3,768,476

[45] Oct. 30, 1973

[54] URINARY IRRIGATION AND DRAINAGE SYSTEM

[75] Inventor: Russell G. Raitto, Fitzwilliam, N.H.

[73] Assignee: Concord Laboratories, Inc., Keene, N.H.

[22] Filed: Jan. 27, 1972

[21] Appl. No.: 221,330

[52] U.S. Cl............. 128/275, 128/247, 128/349 R, 285/12, 285/260, 285/331, 285/390, 285/423
[51] Int. Cl....................... A61m 25/00, F16l 47/00
[58] Field of Search..................... 285/260, 114, 12, 285/331, DIG. 22, 423, 174, 24, 317, 390; 128/247, DIG. 24, 349, 2 W, 275; 61/12

[56] References Cited
UNITED STATES PATENTS

| 3,588,149 | 6/1971 | Demler | 285/331 X |
|---|---|---|---|
| 3,699,964 | 10/1972 | Ericson | 128/275 |
| 3,537,456 | 11/1970 | Gardena | 128/275 |
| 3,476,158 | 11/1969 | Retzler | 285/12 X |
| 3,513,849 | 5/1970 | Vaillancourt et al. | 128/349 |
| 1,474,905 | 11/1923 | Keszthelyi | 285/331 |
| 3,394,954 | 7/1968 | Sarns | 285/423 X |
| 3,476,412 | 11/1969 | Demler | 285/331 X |
| 1,591,871 | 7/1926 | Heinrich | 285/331 |
| 221,864 | 11/1879 | Robbins | 285/331 X |
| 3,319,979 | 5/1967 | Herold et al. | 285/24 |

FOREIGN PATENTS OR APPLICATIONS

| 962,644 | 12/1949 | France | 61/12 |

Primary Examiner—Thomas F. Callaghan
Attorney—Robert F. O'Connell et al.

[57] ABSTRACT

A connector adapter for use in an irrigation and drainage system having particular use in the irrigation and drainage of the human urinary tract. The adapter includes female and male coupling members, one adapted for connection to a catheter and the other adapted for connection to a drainage bag. The coupling portions of said members have internal sealing surfaces and are arranged so that, when coupled for drainage operation, the overall system is internally sterile and a fluid flow path is provided from the catheter to the drainage bag, the sealing surfaces thereof sealably abutting each other to form a continuous cylindrical opening having an uninterrupted internal surface through both coupling members. Further, the coupling members are linked by a flexible plastic strap so that, when decoupled for irrigation operation, the members remain linked to each other and the opening of the coupler member connected to the catheter is available for the reception of the tip of an irrigation syringe or to a fitting for connection to irrigation bottle source.

15 Claims, 5 Drawing Figures

PATENTED OCT 30 1973 3,768,476

URINARY IRRIGATION AND DRAINAGE SYSTEM

DESCRIPTION OF THE INVENTION

This invention relates generally to urinary irrigation and drainage systems and, more particularly, to a connector adapter for connecting a catheter either to an irrigation fluid source or to a drainage bag, particularly a urinary drainage bag.

In flushing out interior cavities within the human body, such as the urinary tract, irrigation fluid from an appropriate source, such as an irrigation bottle or a syringe, is forced into the tract through an appropriate catheter. The fluid subsequently is withdrawn or drained from the tract through the catheter and passed to an appropriate drainage bag. In order to facilitate alternately forcing and withdrawing the irrigation fluid into and out of the tract, a suitable connector adapter is used to permit the catheter to be readily and easily coupled either to the irrigation source or to the drainage bag with minimum danger of contamination. The adapter is structured so that the fluid passage during drainage is free of contamination-causing crevices and fluid can pass therethrough in each case with minimum danger of contamination. Thus, during irrigation the adapter is arranged to receive, in a fluid-tight manner, either a conventional sterile, tapered fitting attached to the end of a tube which is in turn connected to an irrigation bottle or the sterile, tapered tip of a conventional irrigating syringe. The adapter further is arranged to provide during drainage an appropriate means for coupling the catheter to the flexible input, urinary drainage tube of a urinary drainage bag with minimum risk of contamination. In the latter instance the adapter provides a smooth, tubular opening having an uninterrupted internal surface from the catheter through the coupling adapter to the drainage tube. Accordingly, during the drainage operation no crevices or indentations are present in the adapter opening, which crevices might permit the accumulation of bacteria, particularly during irrigation, and, hence, a contamination of fluid flowing therethrough. Moreover, if the coupling adapter has a continuous, smooth surface, turbulent flow of fluid is prevented and an even flow of fluid therethrough is produced as desired.

Further, it is desirable that the coupling adapter permit no leakage of fluid and, accordingly, the interior thereof must be in a completely sealed state when coupled and the sealing surfaces thereof must remain in an aseptic condition so that no contamination of them can occur.

Further, when the drainage tube (and hence the drainage bag) are decoupled from the catheter, which remains in the patient, it is desirable that neither the coupling portion of the adapter which is attached to the end of the drainage tube nor the coupling portion of the adapter which is attached to the catheter become subject to any contamination when the adapter is not being directly used for coupling.

In accordance with the invention, a coupling adapter is provided for coupling a catheter either to a drainage bag or to an irrigation fluid source without contamination of the critical interior portions of the adapter so that when the drainage bag is fully coupled to the catheter a smooth and uninterrupted opening is provided therethrough for producing a non-turbulent flow of fluid.

The coupling adapter of the invention comprises a female coupler member and a male coupler member, which members in a preferred embodiment are linked by a flexible, plastic strap made, for example, of a polyvinyl chloride or polyethylene material. Thus, when the connector adapter is decoupled to separate the drainage tube from the catheter for irrigation through the coupler member secured to the catheter, the two coupler members remain linked to prevent the coupler member attached to the drainage tube from being contaminated by placement on a contaminated surface. Thus, the coupler member connected to the drainage tube is free to hang from the coupler member which is connected to the catheter for use in the irrigation process.

As described more fully below, the male and female coupling members each have a recessed sealing surface, which surfaces in each case are appropriately enclosed by cylindrical members which protect them from contamination and retain them in an aseptic condition during the handling and use of the adapter throughout the entire irrigation and drainage processes and also when the adapter is in an uncoupled condition.

The invention can be described in more detail with the assistance of the enclosed drawings wherein FIG. 1 depicts a closed drainage system in which the connector adapter of the invention can be used;

Figure 1:
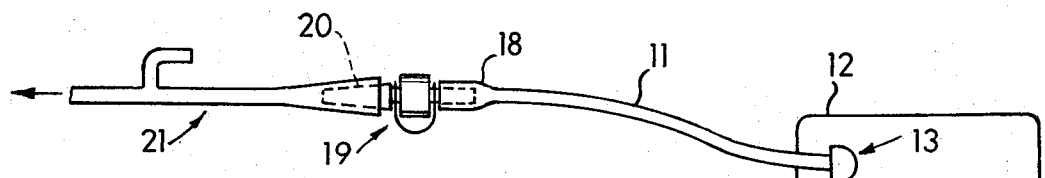

As can be seen in FIG. 1, the connector adapter of the invention can be used in a urinary drainage system which includes a collapsible sealed urinary drainage bag 10, usually of a disposable nature and made, for example, of two flat sheets of flexible, transparent or translucent plastic film material, such as polyvinyl chloride or polyethylene, sealed along their edges. Drainage bag 10 has a flexible urinary drainage input tube 11 sealably connected thereto near a corner 12 thereof, one end 13 of tube 11 extending inwardly of the drainage bag, as shown. A drainage output tube 14 is sealably connected to drainage bag 10 at a lower edge 15 thereof, one end 16 of tube 14 also extending inwardly of the drainage bag, as shown.

Output tube 14 acts as a draw-off tube for withdrawing drainage fluid from the bag. An appropriate clamp 17 which may be of a conventional metal, or plastic, type is provided at the draw-off tube for closing and opening the tube to permit or prevent flow of fluid therethrough as desired.

Input tube 11 is conventionally made of a soft, flexible transparent or translucent plastic, e.g., polyvinyl chloride, and is attached at its other end 18 to a tubular projection of a connector adapter 19 described in more detail below. Connector adapter 19 also functions as a catheter adapter and has a tapered end 20 which is in turn connected to an appropriate catheter 21 which may be, for example, a well-known Foley catheter, a portion of which is shown.

During urinary drainage, it is desired to drain fluid from the urinary tract, for example, through the catheter 21 and, thence, through the connector adapter 19 to input tube 11 into the drainage bag 10. The urinary drainage process is a closed system operation in which it is desired that a non-turbulent flow of fluid be permitted to take place from the catheter to the drainage bag. Further, it is desirable that the flow passage through the connector adapter be designed so that there are no crevices or pockets formed therein which can collect bacteria and contaminate the fluid which flows therethrough. Accordingly, the connector adapter 19 is fabricated so as to provide a smooth opening from one end to the other with an uninterrupted internal surface therein when the two coupling members thereof are fully coupled. To this end the connector adapter is arranged so that the two coupling members 22 and 23 forming the adapter 19, when joined together, form suitable, smooth sealed surfaces and a continuous uninterrupted opening is provided, the adapter in effect thereby acting as a self-flushing or self-cleaning device when fluid flows therethrough. The details of the sealing surfaces of the adapter are discussed in connection with FIGS. 2, 2A and 3 discussed below.

Figure 2:
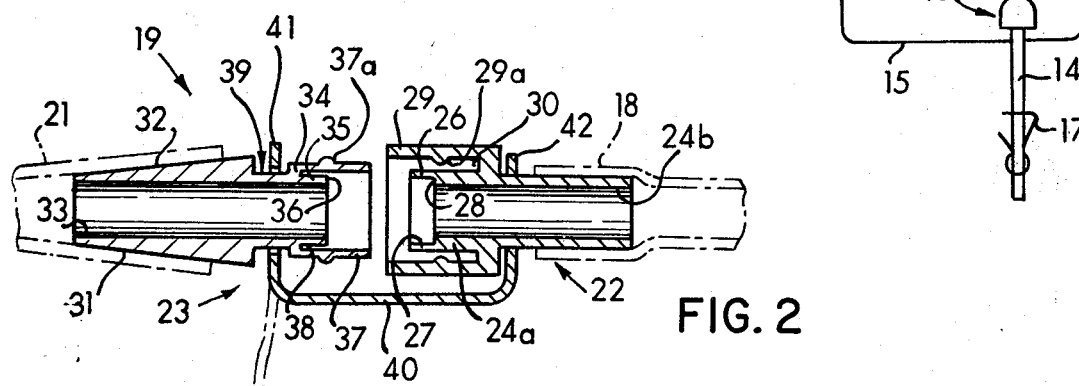
FIG. 2 shows a view in longitudinal cross-section of the coupling members of the connector adapter of FIG. 1 in a decoupled state.
Figure 2A:
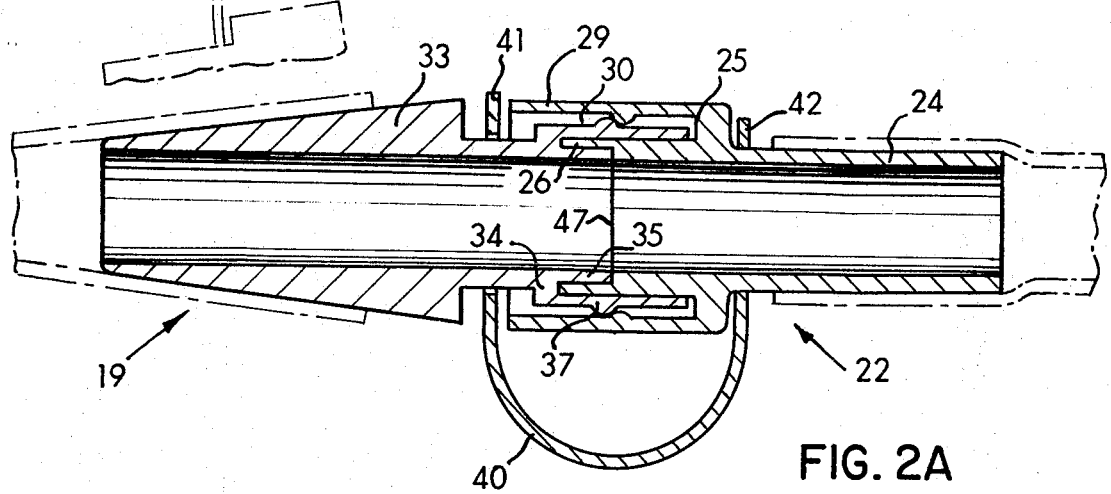
FIG. 2A shows an enlarged view in longitudinal cross-section of the connector adapter of FIG. 2 in a coupled state.
Figure 3:
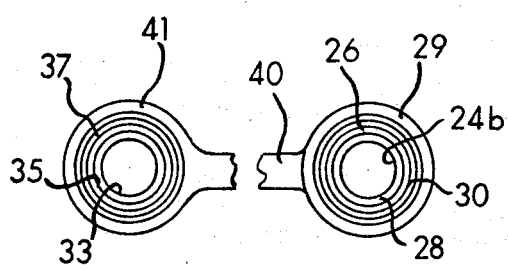
FIG. 3 shows end views of the coupling members of the connector adapter of FIGS. 1, 2 and 2A.
Figure 4:
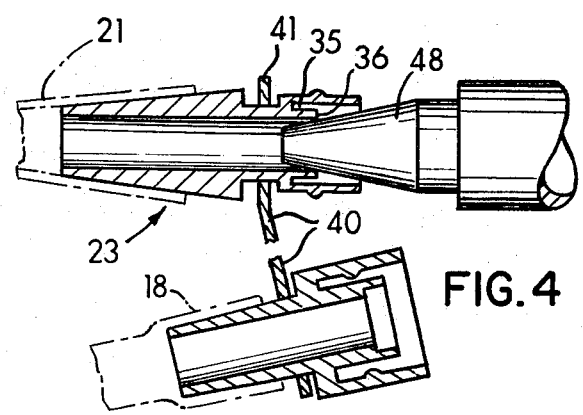
FIG. 4 shows a longitudinal view in cross-section of a portion of the connector adapter of the invention as used during an irrigation process.

As shown in FIGS. 2 and 2A, connector adapter 19 is of a molded plastic form and comprises two coupling members thereof designated in a preferred embodiment shown as female coupler 22 and male coupler 23, shown in the figures both in a decoupled and in a coupled state, respectively.

As shown therein, female coupler member 22 includes a cylindrical shank or body portion 24 having a cylindrical bore 24B and an enlarged diameter cylindrical coupling portion 25, the inner end 24A of cylindrical body portion 24 extending partially into the coupling portion 25. A first inner cylindrical member 26 extends from the inner end 24A of cylindrical body portion 24 to a point beyond such inner end to form an inner recess 27 having an inner diameter larger than that of cylindrical body portion 24 so that an appropriate shoulder, or internal sealing surface 28, is formed at the inner end 24A as shown. A second outer cylindrical member 29 having a larger diameter than cylindrical member 26 encircles the latter member at a spaced distance from the circumference thereof so as to form an annular recess 30 therebetween. Cylindrical member 29 is longer than cylindrical member 26 and, accordingly, extends sufficiently beyond the latter member, as shown, to provide an effective protective sheath for it and for the sealing surface 28, the latter of which is protected not only by member 29 but also by member 26, both of which surround it.

Male coupler member 23 includes a catheter adapter or body portion 31 and a coupling portion 34 also forming the shank of the catheter adapter portion. The exterior surface 32 of catheter adapter portion 31 is fashioned in a tapered form so as to fit the tapered end of a conventional catheter, the interior surface of catheter adapter portion 31 being formed to provide a cylindrical opening 33 which extends from one end of the taper into the shank-coupling portion 34. The inner extension of cylindrical opening 33 thereby effectively forms an inner cylindrical shank 35 within coupling portion 34, the inner diameter of opening 33 of which is equal to the inner diameter of cylindrical member 24 of female coupler 22.

The inner edge of cylindrical shank 35 accordingly forms an effective sealing surface 36 which operates during coupling to form a seal with surface 28 of female coupler 22 as described more fully below. Coupling portion 34 of male coupler 23 further includes an outer cylindrical member 37 which encircles inner cylindrical member 35 and is radially spaced therefrom so as to form an annular recess 38 therebetween. Outer cylindrical member 37 is longer than inner cylindrical member 35 and, accordingly, extends sufficiently beyond the latter member to provide an effective protective sheath for the sealing surface 36 as well as for the whole of shank 35 to prevent contamination thereof by contact with a contaminated surface.

Tapered portion 31 and coupling portion 34 are further molded so that an annular notch or groove 39 is formed therebetween at the exterior of male coupler 23, as shown. A flexible strap 40 is used to link the female and male coupler members of connector adapter 19. In the preferred embodiment shown, a ring 41 at one end of strap 40 fits into notch 39 and is freely rotatable therein and with respect thereto, while at the other end of strap 40 a ring 42 having a diameter slightly smaller than ring 41 is press fitted onto the exterior surface of tubular portion 24 of female coupler 22 to provide a relatively immobile attachment thereto.

As shown in phantom in FIG. 2, the female coupler 22 and attached irrigation tube 11 dangle from male coupler 23 by means of strap 40 so that when the adapter is decoupled for use during an irrigation process, as discussed further below, the female coupler is out of the way and yet need not be placed on any potentially contaminated surface. Accordingly, its interior, particularly the sealing surface 28 and member 26 (including its end) therein, remain in an aseptic condition. The female coupler may be permitted to hang freely from the male coupler during use, while a user grasps the male coupler with the thumb and forefinger of one hand, or the female coupler may also be grasped by the third and little finger of the same hand, for example, and purposely held even further away from the entrance of the male coupler during the irrigation process.

In order to couple the female and male coupler members 22 and 23, outer cylindrical member 37 of male coupler 23 is externally threaded at 37a and outer cylindrical member 29 of female coupler 22 is correspondingly internally threaded at 29a. Thus, female coupler 22 can be threadably secured to male coupler 23 as shown in FIG. 2A and when so secured the threaded outer cylindrical member 37 of male coupler 23 extends into the annular recess 30 of the female coupler 22 to form a rigid connection. Further, the inner cylindrical member 26 of female coupler 22 extends into the annular recess 38 of male coupler 23 so that its inner end effectively abuts the inner end of such recess. When the two coupler members are so secured the sealing surfaces 28 and 36 abut each other so as to form a tight seal at their junction along line 47, as shown best in FIG. 2A. Since the inner diameters of cylindrical opening 24B of female coupler 22 and cylindrical opening 33 of male coupler 23 are equal, an opening having a continuous, uninterrupted internal surface extends from one end of the connector adapter to the other when the male and female coupler members are coupled for drainage operation, as shown in FIG. 2A. Thus, during drainage the overall unit from catheter to drainage bag is maintained in an internally sterile condition.

When an irrigation operation is to be performed, the male and female coupler members are aseptically decoupled by unthreading them to expose the opening in shank 35 for irrigation. Such decoupling is achieved by having the user, such as a nurse, firmly grasp the male coupler (with catheter still attached and in place in the patient) in the thumb and forefinger of one hand, for example, to maintain the catheter in a steady position in the patient. The other hand is used to unthread female coupler 22 from male coupler 23 through appropriate rotation thereof. During the rotation of coupler 22 the ring 41 of strap 40 also rotates in notch 39 so that a complete unthreading can occur without causing any twisting of the strap itself. Accordingly, the decoupling of the two elements can be manually achieved rapidly and with no difficulty. When the female coupler has been appropriately detached it then can be permitted to dangle from the male coupler (while still attached to the drainage tube and drainage bag) via the linkage provided by strap 40. As mentioned above, the female coupler and attached drainage tube may be permitted to hang freely from strap 40 or it may be grasped by the third and little fingers of the left hand, for example, and held completely out of the way during the irrigation process.

During the irrigation process, the tapered tip 48 of a conventional irrigation syringe, or the sterile tapered tip of a conventional adapter connected to a flexible tube connected to an irrigation bottle positioned above the level of the patient, is inserted into the exposed sterile inner end of inner cylindrical member 35 of male coupler 23 and held firmly by manual pressure against the inner edge of the exposed sealing surface 36 to form a fluid seal. Thus, during the irrigation process, sterile irrigation fluid is forced under pressure into the male coupler member and thence into the catheter and into the patient, none of such fluid being permitted to touch the sealing surface 36 so that the latter remains uncontaminated by any fluid.

Moreover, during the coupling and decoupling procedure and during insertion and removal of the syringe tip into the member 35, neither the sealing surface 36 nor the sealing surface 28 are permitted to touch anything contaminated, either by being laid down on a potentially contaminated surface or by being touched by the fingers of the nurse, or other user of the device, because both surface are at all times fully protected by the outer cylindrical sheaths which encircle them. Further, the female coupler 22 need not be placed on any surface where contamination might occur since strap 40 permits it to remain linked with male coupler 23 even during the irrigation process.

When the irrigation process is finished and it is desired to drain the patient's urinary tract, the female coupler 22 can be readily grasped by the fingers of the operator's free hand and again easily threaded onto the male coupler 23 as before, again to connect the catheter with the drainage bag through the drainage tube.

The threaded members of both the male and female coupler are arranged in a preferred embodiment to provide approximately a three-fourths turn to produce a tight coupling. Such a threaded arrangement permits an effective coupling of the male and female coupler members without producing any undesirable twisting of the flexible tube leading from the female coupler to the drainage bag. Other appropriate alternative locking means, such as a bayonet lock, may be used to secure the coupler members together or the members may be arranged to provide merely a press fit. In the latter cases, there is no need for rotation of the female coupler and, consequently, twisting of the flexible tube leading to the drainage bag can be avoided entirely.

Although the female and male coupling members are preferably made of the same material, they need not be in all applications. Further, such members are preferably made of a relatively rigid plastic as compared with the drainage tube, such as polyvinyl chloride or phenol formaldehyde resin, although they need not be in all applications. Although in the preferred embodiment described above the male coupling member of the connector adapter forms the catheter adapter, the connector adapter alternatively may be located in the drainage tube itself, spaced from the catheter adapter. In addition, the coupling member which is attached to the drainage bag may be a male coupling member while the coupling member attached to the catheter may be a female coupling member. In such a case, if the female member is to function as a catheter adapter, its protruding shank should be tapered, while the protruding shank of the other member may or may not be tapered.

Although the preferred use of the invention is for urinary irrigation and drainage, the invention may be used to irrigate and drain any other body cavity.

The aforesaid description and examples are given by way of example and it is not intended that the invention be limited thereto or to any theory advanced but only to the products and methods described in the following claims and their equivalents.

What is claimed is:

1. A system for draining fluids from a body cavity of an animal through a catheter and drainage tubing to a drainage bag and for alternately irrigating said cavity, said system including said drainage bag, said drainage tubing, said catheter and connector adapter means for alternately connecting said catheter with said drainage bag for said drainage and for disconnecting said catheter from said drainage bag for said irrigation, said adapter means comprising a female coupler member including
   a body portion having a first cylindrical opening therethrough and connected to one of said drainage bag and said catheter, and
   a female coupling portion having a first sealing surface therein;
a male coupler member including
   a body portion having a second cylindrical opening therethrough of the same diameter as said first cylindrical opening connected to the other of said catheter and drainage bag, and
   a male coupling portion having a second sealing surface therein;
said male and female coupling portions having means for coupling and uncoupling said coupler members to and from each other so that, when coupled, a smooth, uninterrupted sealed internal fluid flow path substantially free from contaminant-collecting spaces or pockets is provided through said coupling members and said first and second sealing surfaces sealably abut one another to form a continuous cylindrical sealed opening having a smooth uninterrupted sealed internal surface through said coupler members, said surface forming said fluid path, a flexible strip joining said male and female coupler members, respectively, so that, when decoupled, said coupler members remain linked by said strip and the cylindrical opening of said coupler member connected to said catheter is exposed to receive the tip of an irrigation syringe or a fitting for connection to a source of irrigation fluid.

2. A system in accordance with claim 1 wherein at least one end of said strip is rotatably joined to one of said coupler members.

3. A system in accordance with claim 1 wherein said flexible strip comprises a plastic strap having a first ring at one end thereof for encircling said male coupler member and a second ring at the other end thereof for encircling said female coupler member.

4. A system in accordance with claim 3 wherein at least one of said coupling members has an annular notch, the ring encircling said member being rotatably positioned in said notch and the ring encircling the other of said coupling members being substantially non-rotatably joined to the body of said coupler member.

5. Connector adapter means in accordance with claim 1 wherein
said first cylindrical opening of said female coupler member extends into said coupling portion thereof, said coupling portion including
a first inner cylindrical member located at the extended end of said first cylindrical opening, said first inner cylindrical member having a diameter larger than that of said first cylindrical opening whereby said first sealing surface is formed at said extended end,
a first outer cylindrical member being spaced from and encircling said first inner cylindrical member to form a first recess therebetween; and further wherein said second cylindrical opening of said male coupler member extends into said coupling portion thereof to form a second inner cylindrical member having said second sealing surface at the extended end thereof, said coupling portion including
a second outer cylindrical member being spaced from and encircling said second inner cylindrical member to form a second recess therebetween;
whereby, when said male and female coupler members are coupled together, said second outer cylindrical member extends into said first recess, said second inner cylindrical member extends into said enlarged diameter of said first inner cylindrical member and said first inner cylindrical member extends into said second recess so that said first and second sealing surfaces sealably abut one another to form said continuous sealed cylindrical opening through said coupler members.

6. Connector adapter means in accordance with claim 5 and further including
means for permitting said male and female coupler portions to be securely engaged when said coupler members are coupled.

7. Connector adapter means in accordance with claim 5 wherein said first outer cylindrical member is longer than said first inner cylindrical member so that said first sealing surface is protected from contamination.

8. Connector adapter means in accordance with claim 7 wherein said second outer cylindrical member is longer than said second inner cylindrical member so that said second sealing surface is protected from contamination.

9. Connector means in accordance with claim 5, wherein said body portion of said female coupler member is cylindrical and is adapted to be connected to said drainage bag; said body portion of said male coupler member is externally tapered and is adapted to be connected to said catheter.

10. A system according to claim 5, said first outer cylindrical member extending axially toward said male coupler member at least as far as said first inner cylindrical member and said second outer cylindrical member extending axially toward said female coupler member at least as far as said second inner cylindrical member, whereby said outer cylindrical members protect said inner cylindrical members from contamination.

11. A system according to claim 10, each of said outer cylindrical members extending axially beyond its inner cylindrical member.

12. A system according to claim 5, said inner and outer cylindrical members being provided with means to advance one of said coupler members with respect to the other to force the two sealing surfaces into sealing contact with each other so as to form said continuous smooth uninterrupted surface substantially free from contaminant-collecting pockets or spaces.

13. A system in accordance with claim 1 wherein
said first cylindrical opening of said female coupler member extends into said coupling portion thereof, said coupling portion including
a first cylindrical member located at the extended end of said first cylindrical opening, said first cylindrical member having a diameter larger than that of said first cylindrical opening to form an internal shoulder which forms said first sealing surface, said second cylindrical opening of said male coupler member extending into said coupling portion thereof to form a second cylindrical member having said second sealing surface at the extended edge thereof,
whereby, when said male and female coupler members are coupled together said second cylindrical member extends into said enlarged diameter of said first cylindrical member with said first and second sealing surfaces sealably abutting one another to form said continuous uninterrupted smooth sealed cylindrical opening through said coupler members,
means to (a) advance said coupler members toward each other to force said second cylindrical member into said enlarged diameter and said second and first sealing surfaces into sealing engagement with each other to form said smooth, continuous uninterrupted surface and (b) to lock said coupler members in said sealing engagement.

14. Connector adapter means for use in an irrigation and drainage system, said adapter means comprising
a female coupler member including
a body portion having a first cylindrical opening therethrough and adapted to be connected to at least one of a drainage bag and a catheter, and
a female coupling portion having a first sealing surface therein:
a male coupler member including
a body portion having a second cylindrical opening therethrough of the same diameter as said first cylindrical opening and adapted to be connected to the other of said catheter and drainage bag, and a male coupling portion having a second sealing surface therein;

said male and female coupling portions having means for permitting said coupler members to be coupled to, and decoupled from, each other so that, when coupled, a fluid flow path is provided from said catheter to said drainage bag and said first and second sealing surfaces sealably abut one another to form a continuous cylindrical opening having an uninterrupted internal surface through said coupler members; and flexible means joined at its ends to said male and female coupler members, respectively, so that, when decoupled, said coupler members remain linked by said flexible means and the cylindrical opening of said coupler member connected to said catheter is capable of receiving this tip of an irrigation syringe or a fitting for connection to a source of irrigation fluid, said body portion of said female member being cylindrical and adapted to be connected to said drainage bag;

said body portion of said male coupler member being externally tapered and adapted to be connected to said catheter;

said first cylindrical opening of said female coupler member extending into said coupling portion thereof, said coupling portion including a first inner cylindrical member located at the extended end of said first cylindrical opening, said first inner cylindrical member having a diameter larger than that of said first cylindrical opening whereby said first sealing surface is formed at said extended end;

a first outer cylindrical member being spaced from and encircling said first inner cylindrical member to form a first recess therebetween; and further wherein said second cylindrical opening of said male coupler member extends into said coupling portion thereof to form a second inner cylindrical member having said second sealing surface at the extended end thereof, said coupling portion including a second outer cylindrical member being spaced from and encircling said second inner cylindrical member to form a second recess therebetween;

whereby, when said male and female coupler members are coupled together, said second outer cylindrical member extends into said first recess and said first inner cylindrical member extends into said second recess so that said first and second sealing surfaces sealably abut one another to form said continuous sealed cylindrical opening through said coupler members, the interior surface of said first outer cylindrical member and the exterior surface of said second outer cylindrical member being correspondingly threaded to permit said coupler members to be threadably coupled and decoupled from each other.

15. Connector means according to claim 14, wherein said flexible means comprises a plastic strap having a first connecting means for connection with said male coupler member and a second connecting means for connection with said female member, at least one of said connecting means being rotatable with respect to its coupler member to thereby permit said threadable coupling and uncoupling.

* * * * *